Patented Aug. 5, 1930

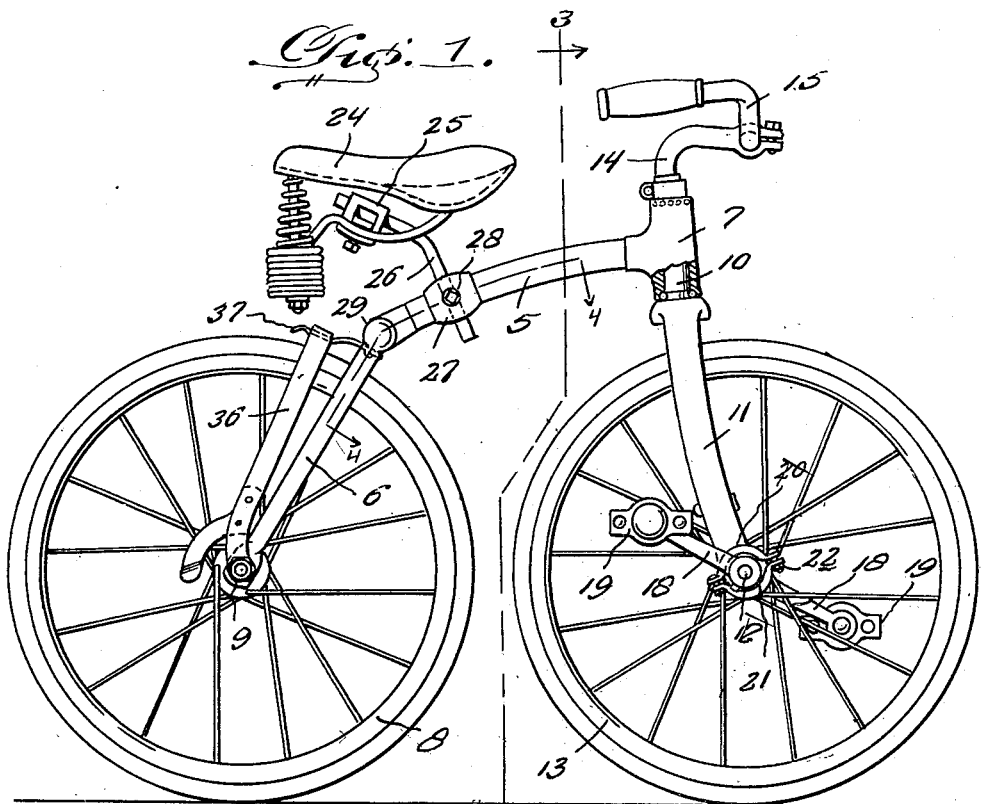
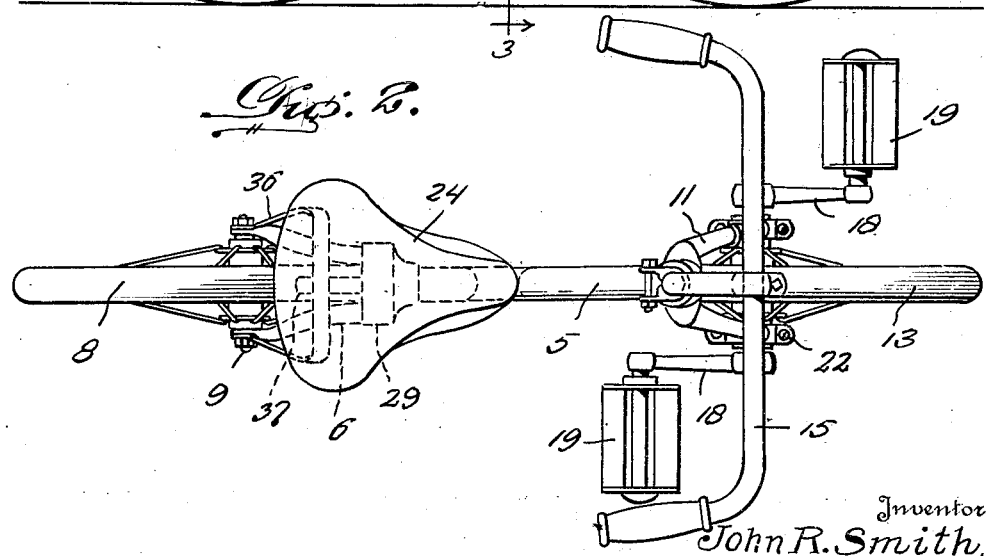

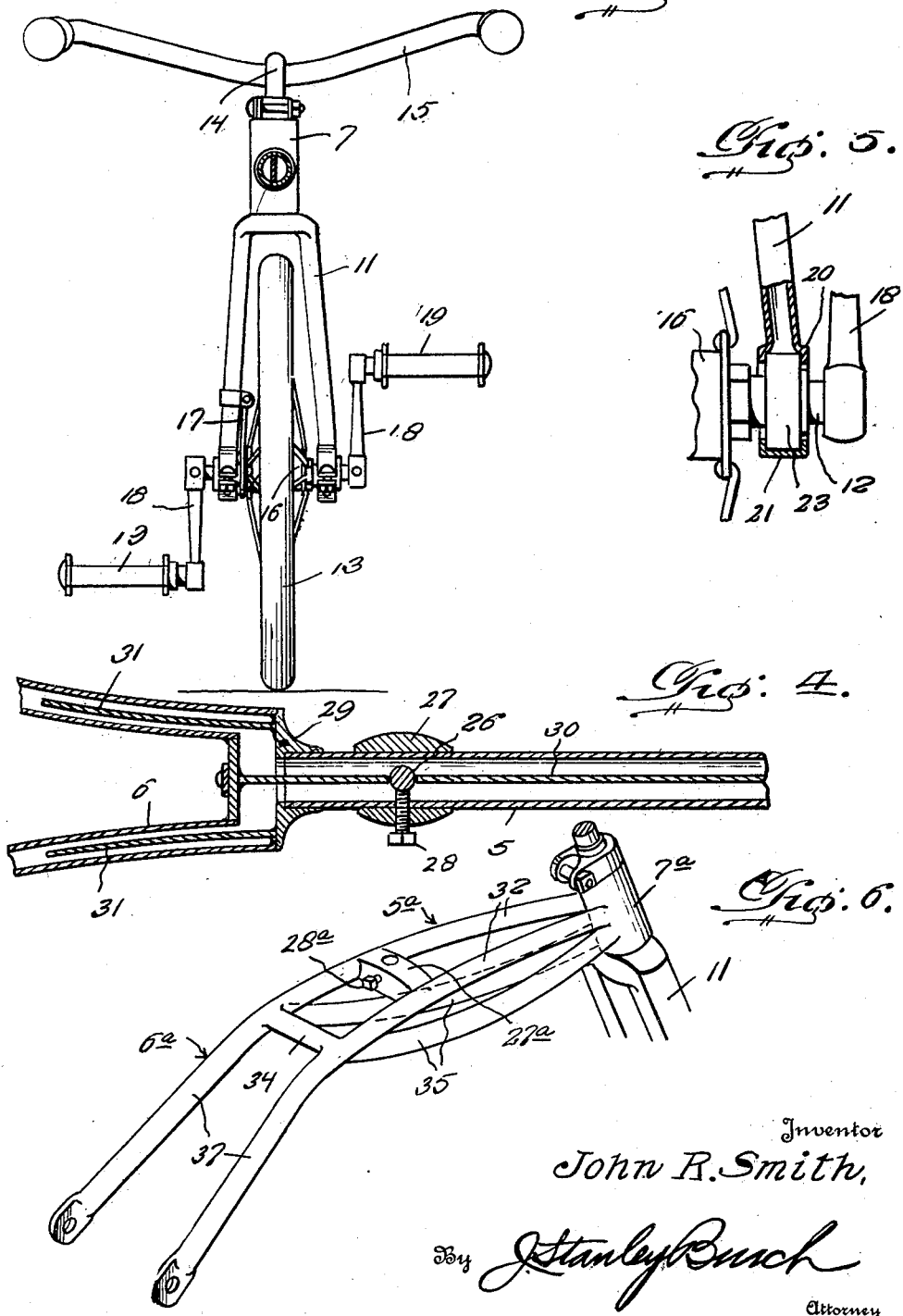

1,772,231

UNITED STATES PATENT OFFICE

JOHN R. SMITH, OF MASSILLON, OHIO

CHILD'S BICYCLE

Application filed June 12, 1928. Serial No. 284,745.

This invention relates to an improved child's bicycle, and has for its primary object to provide a bicycle of this kind which is simple and durable in construction, economical to manufacture, and devoid of objectionable propulsion gearing and projecting parts such as are likely to cause injury to the child or tearing of the child's clothes.

A further object is to provide a bicycle of the above kind having a novel frame construction which is quite strong, although extremely simple and inexpensive to construct.

Another object is to provide an improved bicycle of the above kind having a front axle and wheel assembly provided with pedals, pedal cranks, and a coaster brake, thereby enabling the child to readily propel and control the speed of travel of the bicycle without the use of propulsion gearing and special separate braking means, and permitting the use of a short upper longitudinal frame member which may be made to effectively resist bending and breaking without the use of a lower longitudinal frame member.

Other objects of the present invention will appear from the appended description of the embodiment of the same illustrated in the accompanying drawings.

In the drawings:—

Figure 1 is a side elevational view of a child's bicycle embodying the present invention.

Figure 2 is a top plan view thereof.

Figure 3 is a transverse vertical section on line 3—3 of Figure 1.

Figure 4 is an enlarged fragmentary longitudinal section of the frame on line 4—4 of Figure 1.

Figure 5 is a fragmentary detail view, partly in section, showing the manner of journalling the front axle in the lower ends of the prongs of the front fork; and Figure 6 is a fragmentary perspective view showing a modified form of frame construction.

Referring to the drawings in detail, 5 indicates the upper longitudinal frame member of the bicycle having secured to the rear end thereof or formed integral therewith, the rear fork 6 and having secured to the front end thereof or formed integral therewith, the steering knuckle 7. In the rear fork 6 is journaled the rear wheel 8 in any suitable manner upon an axle 9. A short steering column 10 is journaled in the steering knuckle 7, and carries the front fork 11 in which is journaled the front axle 12 carrying the front wheel 13. The steering column 10 carries a handle post 14, which in turn carries the handle bar 15 of any suitable construction.

The hub 16 of the front wheel 13 carries a conventional coaster brake (not shown) such as is commonly used in the hub of the rear wheel of a large bicycle, the arm 17 of which is connected to one leg or prong of the front fork 11. In order that the front axle 12 may be directly driven to avoid the use of propulsion gearing, the ends of said axle 12 project at opposite sides of the fork 11 and have crank arms 18 fixed thereon, which in turn carry pedals 19.

The prongs of the forks 6 and 11 are of tubular form, and on the lower ends of the prongs of the front fork 11, integral therewith, are channel-shaped clamping saddles 20 having channel-shaped clamping yokes 21 bolted thereto as at 22. The front axle 12 is journaled in ball bearings, the outer races 23 of which are fitted in the channels of and clamped between the clamping saddles 20 and yokes 21 of the front fork 11 as shown in Figures 1 and 5.

A seat 24 is connected by suitable means, such as a clamp 25, to a seat post 26, and secured to the upper longitudinal frame member 5 between the ends of the latter is a seat post block 27 apertured to receive the saddle post and a set screw 28 by which said seat post is held in vertically adjusted positions to regulate the height of the seat 24.

It will be particularly noted that the longitudinal frame member 5 inclines slightly downwardly in a rearward direction, and that the rear fork 6 extends as a continuation thereof at a steep rearward inclination from the rear end of the same. This enables the use of a very short frame member 5 which may be entirely locally braced in an effective manner to resist bending and breaking, and permits mounting of the seat 24 on the frame member 5 so that the weight of the occupant may be safely imposed on said frame member at a point sufficiently forward within convenient reach of the pedals 19. A very simple and cheap frame may thus be practically employed which requires and has no lower longitudinal frame member, a construction heretofore only satisfactorily obtained in velocipede construction of the three-wheeled type.

In the construction of Figures 1 to 4 inclusive, the longitudinal frame member 5 is in the form of a single pipe of suitable size, and the prongs of the rear fork 6 are in the form of smaller pipes joined at their upper ends to the ends of a T-fitting 29 secured on the rear end of said frame member 5. In this instance, the frame member 5 is preferably locally braced or reinforced by means of a vertically disposed "knife-blade" reinforcing strip 30 fitted and secured in said frame member 5 diametrically of the latter and extending from end to end of the same. Similar local reinforcing strips 31 are also preferably provided in the prongs of the rear fork 6 as shown in Figure 4, and in this embodiment the seat post block 27 consists of a heavy collar fitted and secured on the frame member 5 adjacent but forwardly of the rear end of the latter. Naturally, the frame member 5 in this form will be apertured to receive the seat post 26 and the set screw 28, while the reinforcing strip 30 will be interrupted to permit passage of the seat post through the block 27 and the frame member 5. This form of frame may also utilize a steering knuckle 7 in the form of a T-fitting secured on or formed integral with the forward end of the frame member 5, as shown.

In the construction shown in Figure 6, the upper frame member 5ª consists of a pair of small pipes 32 joined at their forward ends to the steering column 7ª and disposed in side by side relation, the pipes 32 being extended rearwardly in diverging relation and having extensions 33 at their rear ends forming the prongs of the rear fork 6ª. The pipes 32 are rigidly connected at the juncture of the frame member 5ª with the fork 6ª by a cross bar 34 that constitutes the upper end of said fork, and the seat post block 27ª consists of a solid piece of metal secured between the pipes 32 forwardly of the cross bar 34 and having a set screw 28ª to hold the seat post in adjusted positions. In this instance, the frame member 5ª is locally braced or reinforced by means of downwardly arched longitudinal tubular braces or pipes 35 disposed in side by side relation beneath the respective pipes 32 and joined to the steering knuckle 7ª at their forward ends directly below the pipes 32, the rear ends of the braces 35 being joined to the under sides of the pipes 32 at the cross bar 34 or at the rear end of the frame member 5ª formed by said pipes 32. As the remaining elements of the bicycle of Figure 6 will be the same as those of the bicycle of Figures 1 to 3 inclusive, it has been thought unnecessary to duplicate the same in said Figure 6. The elements referred to include the wheels, axles, coaster brake, crank arms, pedals, front fork, handle post, handle bar, saddle, and seat post. By the construction of Figure 6, a slightly longer longitudinal frame member is practically permitted to suit the requirements of larger children. A U-shaped stand 36 may be pivotally mounted upon the ends of the rear axle 9 for the purpose of providing a support for the bicycle when not in use, a latch 37 being attached to the top of the rear fork 6 to hold the stand in raised inoperative position.

Minor changes may be made without departing from the spirit and scope of the invention as claimed.

What I claim as new is:

1. In a child's bicycle, a frame comprising an upper tubular longitudinal member terminating in a downwardly inclined rear fork, a front fork at the forward end of the member, front and rear wheels mounted in the respective forks, a vertically disposed reinforcing rib arranged in the tubular member and extending for the full length thereof, said tubular member being formed with vertically arranged seat post receiving openings, the adjacent portion of the reinforcing rib being separated to accommodate the seat post.

2. In a frame construction for bicycles, a vertically disposed steering knuckle, a pair of rearwardly diverging members joined at their converging forward ends to the steering knuckle, the rear ends of said knuckles terminating in downwardly inclined fork-forming prongs, a cross bar interconnecting the members at their juncture with the fork-forming prongs, and arched bracing members connected at their forward converging ends to the steering knuckle below the connection of the aforementioned members with the steering knuckle, the diverging rear ends of the brace members being joined to the first-mentioned frame members at their juncture with the cross bar.

3. In a frame construction for bicycles, a vertically disposed steering knuckle, a pair of rearwardly diverging members joined at their converging forward ends to the steering knuckle, the rear ends of said knuckles terminating in downwardly inclined fork-forming prongs, a cross bar interconnecting the members at their juncture with the fork-forming prongs, and arched bracing members connected at their forward converging ends to the steering knuckle below the connection of the aforementioned members with the steering knuckle, the diverging rear ends of the brace members being joined to the first-mentioned frame members at their juncture with the cross bar, and a seat post supporting block arranged between the frame-forming members forwardly of the cross bar.

In testimony whereof I affix my signature.

JOHN R. SMITH.